United States Patent [19]

Akira

[11] Patent Number: 4,483,066

[45] Date of Patent: Nov. 20, 1984

[54] APPARATUS FOR LOCKING FASTENERS

[75] Inventor: Furutsu Akira, Tokyo, Japan

[73] Assignees: Japan Bano'k Co., Ltd., Tokyo, Japan; Ben Clements & Sons, Inc., South Hackensack, N.J.

[21] Appl. No.: 287,593

[22] Filed: Jul. 28, 1981

[51] Int. Cl.³ .............................................. B23Q 7/10

[52] U.S. Cl. ........................................ 29/811; 29/235; 29/453; 221/276; 227/15; 227/18; 227/120

[58] Field of Search .................. 227/15, 18, 120, 141; 128/92 D, 92 B, 316, 330; 29/235, 453, 811, 241, 244, 267, 268; 221/268, 276

[56] References Cited

U.S. PATENT DOCUMENTS

| | | | |
|---|---|---|---|
| 3,119,115 | 1/1964 | Bello | 227/67 |
| 3,888,402 | 6/1975 | Bone | 227/67 |
| 4,147,168 | 4/1979 | Hayes et al. | 128/330 |

*Primary Examiner*—Howard N. Goldberg
*Assistant Examiner*—Timothy V. Eley
*Attorney, Agent, or Firm*—Blum, Kaplan, Friedman, Silberman & Beran

[57] ABSTRACT

Disclosed is apparatus for locking and dispensing self-lockable fasteners, comprising a pair of a socket holder and an inserting-part holder. The socket holder comprises a groove for holding sockets of a plurality of fasteners in a series arrangement and a pusher for forcing the plurality of series arranged sockets to an opening at the forward end of the socket holder, and the inserting-part holder similarly comprises a groove for holding inserting parts of the same plurality of fasteners in the same series arrangement as in the socket holder and a pusher for forcing the plurality of series arranged inserting parts toward an opening at the forward end of the inserting-part holder. The apparatus includes also a pressing means operable to press the inserting part of a fastener into the socket of the same fastener, at the corresponding forward end portions of the socket holder and the inserting-part holder.

6 Claims, 16 Drawing Figures

APPARATUS FOR LOCKING FASTENERS

BACKGROUND OF THE INVENTION

The present invention relates to apparatus for dispensing filament-like fasteners having lockably engageable terminals for use in for example arranging a plurality of goods in a prescribed single set or attaching tags or the like to individual goods. More particularly, it relates to apparatus for locking and thus dispensing self-lockable filament-type fasteners which indivisually comprise lockably engageable socket and inserting part provided at one and the other ends of an interconnecting intermediate filament and which are brought into a locked condition when the inserting part is received in an aperture of the socket.

Self-lockable filament-type fasteners of the mentioned type are well known for example from the U.S. Pat. No. 4,240,183 to Sumimoto et al, and as therein disclosed, they individually comprise a socket and an inserting part formed at one and the other ends of their connecting filament, which are integrally molded from a pastic material.

In use of the fastener, the filament is applied through the prescribed number of articles or wares, or through a price tag or the like and an item of merchandise to which it is intended to attach the price tag or the like, and its is then looped to let the inserting part at one end of the filament be locked in the aperture of the socket at the other end of the filament. In the looped and locked condition, the fastener functions for example to prevent a member or members of goods to be maintained in a single set or group from being dissociated from the set or group.

Today, application of fasteners effected as above by locking together the inserting part and the socket of individual fasteners is not even partly mechanized but is operated only by hand or rather by both hands, and the operation efficiency is therefore extremely low.

SUMMARY OF THE INVENTION

Accordingly, it is an object of the present invention to provide a fastener locking apparatus by which the conventional manual operation for locking together the socket and the inserting part of the fastener is made mechanically operable.

It is another object of the invention to provide a fastener locking apparatus by which the operation for locking together the socket and the inserting part of the fastener can be carried out simply by an operator gripping his or her single hand.

It is still another object of the invention to provide a fastener locking apparatus which enables to lockably dispense a multiplicity of fasteners successively in a continuous manner of the operation.

To attain the above and other objects which will become apparent as the description proceeds, the apparatus for locking fasteners according to the present invention comprises broadly a pair of a socket holder and an inserting-part holder. The socket holder is provided with a groove for holding sockets of a prescribed or preselected number of fasteners in a series arrangement and a pusher member constantly forcing the series arranged sockets toward an open forward end of the holder. Similar to the socket holder, the inserting-part holder includes a groove for holding inserting parts of the same plurality of fasteners in the same series arrangement as above and a pusher member constantly forcing the series arranged inserting parts toward an open forward end portion of the holder. The fastener locking apparatus further comprises a pressing means for driving the inserting part of a first fastener into the aperture of the socket of the corresponding first fastener located at the open forward end portions of the inserting-part holder and the socket holder. These two holders are structurally so engaged as to be brought closer to each other in operation thereof from their normal positions apart from each other, and when the holders are operated to approach to each other, the pressing means performs its assigned function of pressing the inserting part into the aperture of the socket.

These and other features and advantages of the present invention will become more clearly understood from considering the following description in conjunction with the accompanying drawings.

BRIEF DESCRIPTION OF THE DRAWINGS

FIG. 12 (*b*) similarly is an enlarged perspective view, showing with a portion cut away the forward end portion of the inserting-part holder of the apparatus of FIGS. 3 and 4.

DETAILED DESCRIPTION OF THE PREFERRED EMBODIMENT

Figure 1:
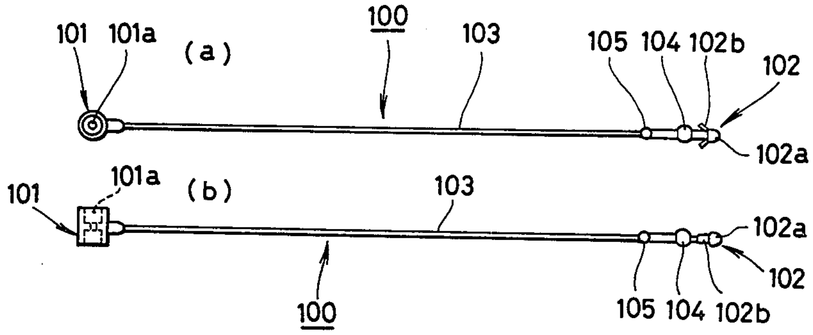
FIGS. 1 (*a*) and 1 (*b*) are respectively a plan view and a side elevational view, showing an example of self-lockable filament-type fasteners in connection with which the apparatus of the present invention is utilized.

As shown in FIGS. 1 (*a*) and 1 (*b*), the self-lockable filament-type fastener indicated at 100 has a socket 101 at its one longitudinal end, an inserting part 102 at its other end and an intermediate filament 103 connecting together the socket and the inserting part, which altogether are integrally molded from a plastic resin material.

While the socket 101 having an aperture or through aperture 101*a* in a central portion thereof for receiving the inserting part 102 therein, the inserting part 102 has at its tip end a head 102*a* and two hooks or tongues 102*b* protruded in a rearwardly flared manner from the bottom surface of the head 102*a*, as well as two spaced lump portions 104 and 105 formed rearward of the hooks 102*b*. The above structural features of the fastener has been conventionally known, and a further detailed description thereof may well be dropped herein.

Figure 2:
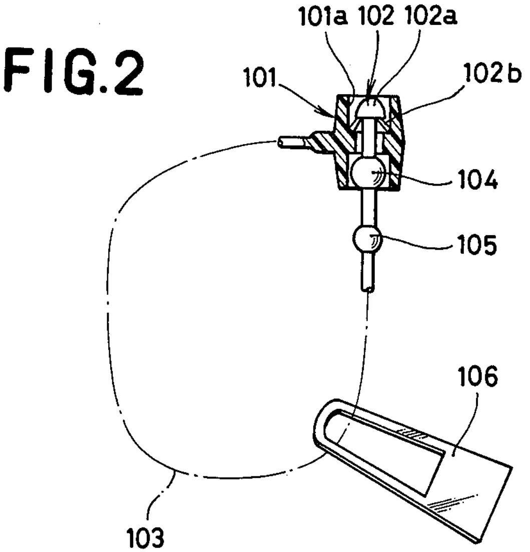
FIG. 2 shows a schematic view, showing partly in section an essential part of the fastener of FIGS. 1 (*a*) and 1 (*b*) in a locked condition.

As shown in FIG. 2, it is operated, in dispensing a fastener having the above described structural features by mutually locking the inserting part and the socket thereof, to pass the filament 103 through a tag or an item of merchandise as indicated at 106, and thereafter, apply the inserting part 102 into the aperture 101*a* of the socket 101 with the head 102*a* and hooks 102*b* passed through a central reduced diametral portion of the aperture 101*a*. In the condition in which, as shown in FIG. 2, the inserting part 102 has been inserted and received in the aperture 101*a*, an attempt may be made to pull back the inserting part 102 out of the aperture 101*a*, when the hooks 102*b* undergo flaring and function to check the inserting part 102 against coming out of the aperture 101*a*, whereby a locking engagement is effected between the inserting part and the socket.

Figure 3:
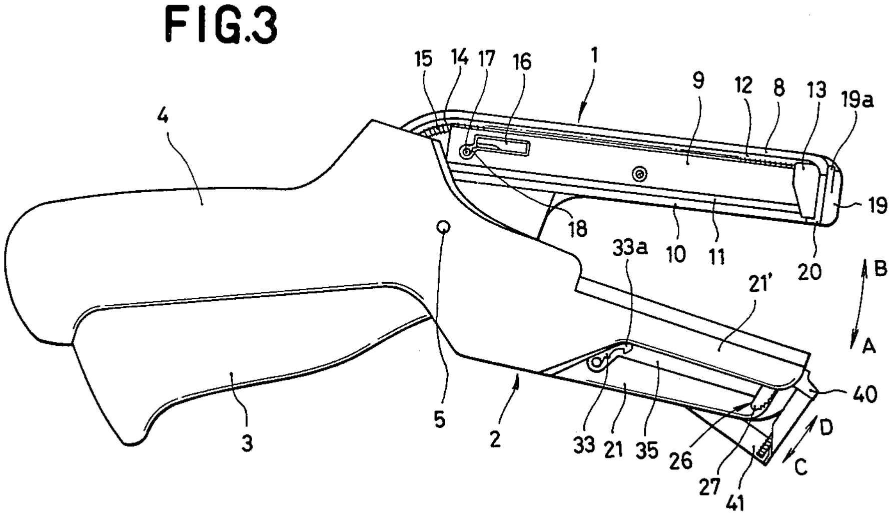
FIG. 3 shows a side elevational view of a fastener locking apparatus embodying the present invention.
Figure 4:
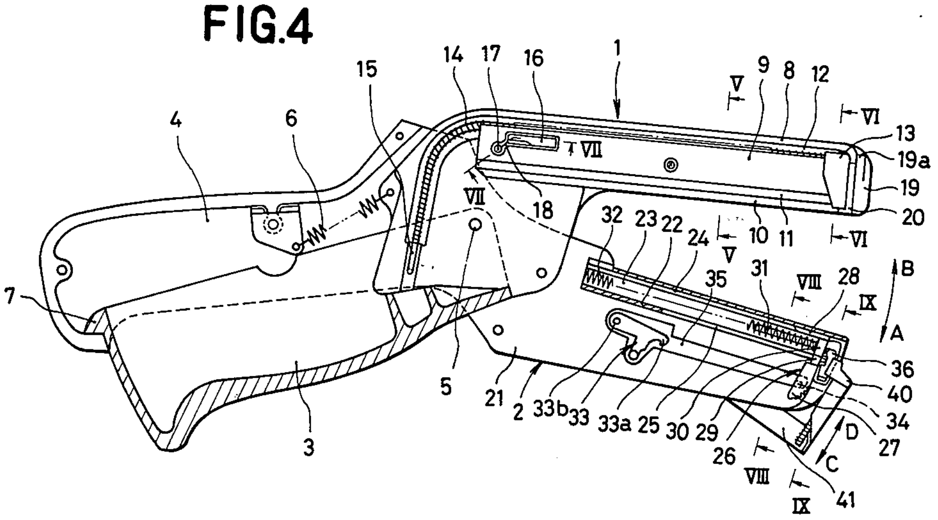
FIG. 4 is a side elevational view similar to FIG. 3, showing the apparatus in FIG. 3 with a portion thereof removed away for illustration of the inside structure.

The apparatus shown in FIGS. 3 and 4, which represents a preferred embodiment of the present invention, makes mechanically operable the above described application of the inserting part into the socket aperture or the operation for locking fasteners, which conventionally has been worked only manually as before indicated.

Now, in FIGS. 3 and 4, reference numerals 1 and 2 respectively denote the socket holder and the inserting-part holder. At the rear end (the left-hand side end in FIGS. 3 and 4), the socket holder 1 is provided with a grip handle 3 in an integral manner of structuring, and similar to this, the inserting-part holder 2 also has a grip handle 4 integrally provided at its rear end. Holders 1 and 2 are connected together by a pin 5 in a manner of being pivotally moved relative to each other as in the case of the two blades of a pair of scissors or nippers.

The inserting-part holder 2 is composed of longitudinally divided left and right members which are coupled in an integral assembly, one of which members is removed away in the illustration of FIG. 4.

Between the socket holder 1 and the inserting-part holder 2, there is a spring 6 extended so that the two holders are constantly subject to an elastic force to pivotally open them in directions shown by a bidirectional arrow A-B with the pin 5 as the center of the pivotal motion, while the angle of opening of the holders being limited within a certain range by the function of a stopper 7 formed at a rear end portion of the holder 3 which contact-engages with a wall portion of the holder 2.

Figure 5:
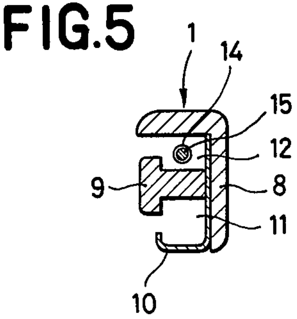
FIG. 5 shows a sectional view taken on line V—V of FIG. 4.
Figure 6:
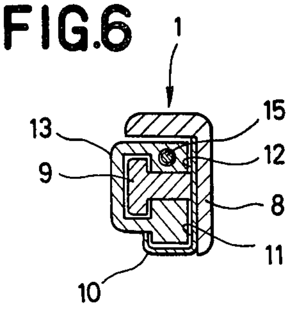
FIG. 6 similarly is a sectional view, taken on line VI—VI of FIG. 4.

With reference to FIGS. 5 and 6 as well as FIGS. 3 and 4, it will be understood that the socket holder 1 has grooves 11 and 12 formed between an elongated bar member 8 having an L-shaped cross-section and inner elongated members 9 and 10 secured to the inside wall face of the bar member 8. At the forward end of the apparatus (the right-hand side end in FIGS. 3 and 4), the groove 12 is closed by an end portion of the bar member 8, while it is curved and extended about its rear end portion toward the rearward end of the bar member 8. With groove 11, the forward end thereof is constantly in an open state. In the grooves 11 and 12, a slider 13 is slidably fitted, which is mounted in a manner of straddling the elongated member 9.

In a central portion of the groove 12, a guide rod 15 is disposed for guiding a spring 14 along the same. The guide rod 15 is secured at its forward end to a forward end portion of the elongated bar member 8 and at its rear end to a side wall portion of the groove 12 in a manner of being embedded in such wall portion. The aforementioned slider 13 is slidable along the guide rod 15 and is constantly acted upon by a resilient force toward the forward end of the socket holder 1 by the spring 14 pressing the slider on its rear end face. On a side face portion of the elongated member 9, located at a rear portion of grooves 11 and 12, there is a stopper 16 provided, by which the slider 13 can be maintained in a stationary position. That is to say, when it is moved backward against the resilient force of the spring 14 up to a point on the guide rod 15 beyond the location of the stopper 16, the slider 13 can engage the rear end face of the stopper 16 and can be stopped at that point.

Figure 7:
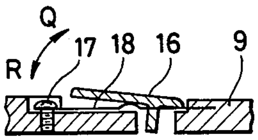
FIG. 7 is also a sectional view, taken on line VII—VII of FIG. 4.

As shown in FIG. 7, the stopper 16 is actuated to have its rear end raised in the direction shown by the letter Q of a bidirectional arrow Q-R by a wire spring 18 secured to the bar member 9 by a screw 17. Thus, when the slider 13 is once moved backward beyond the stopper 16 and then released for free motion, it can be automatically stopped at the raised end of the stopper 16. Then, the raised rear end of the stopper 16 may be retracted in the direction R of the arrow Q-R, whereby the slider 13 can move toward the forward end of the socket holder 1, relied on the function of the spring 14 exerting an elastic force to the slider.

Figure 12:
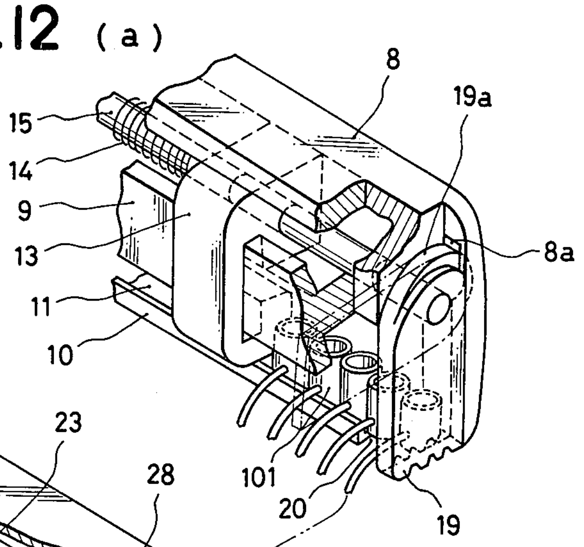
FIG. 12 (*a*) is a perspective view, showing in enlargement and with a portion cut away for clarity, the forward end portion of the socket holder of the apparatus shown in FIGS. 3 and 4.
Figure 12:
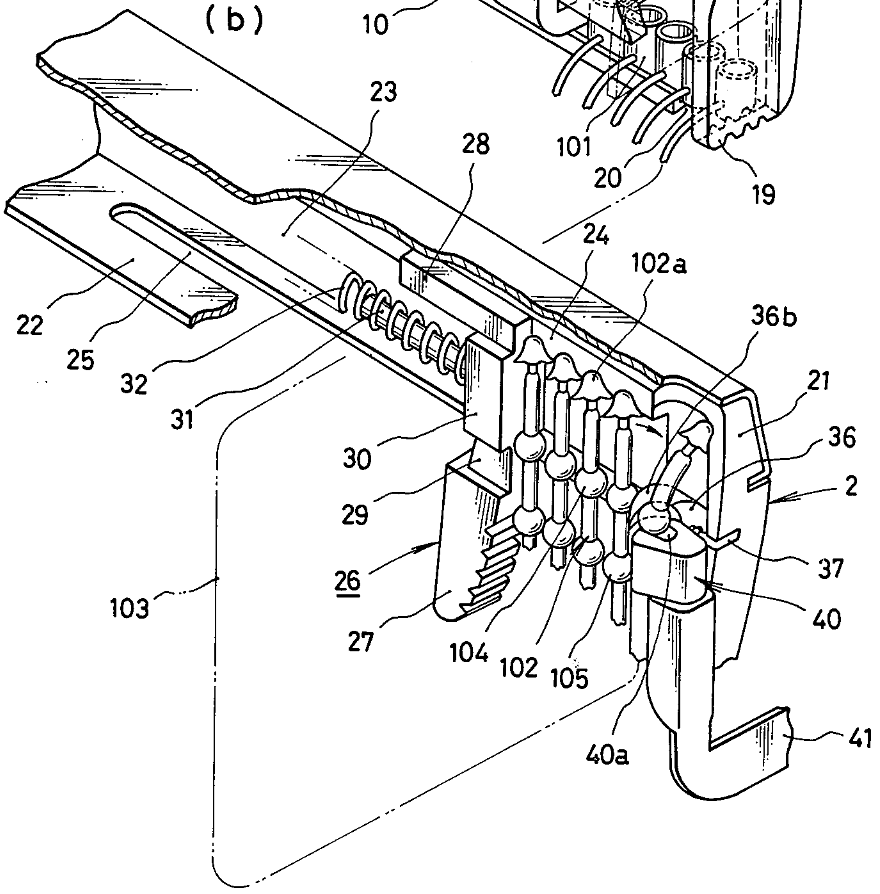

At the forward end of the guide rod 15, which is supported at a front end wall portion of the bar member 8 and extended through the end wall, there is rotatively mounted a stopper plate 19. As shown in detail in FIG. 12 (*a*), the stopper plate 19 is formed, in a portion of its peripheral face, in the form of an arc-shaped collar 19*a*, which is fitted in the compensatively arc-shaped groove 8*a* formed on the inner face of the elongated bar member 8, and by this structural arrangement, it is prevented from being forwardly displaced. Also, the stopper plate 19 is adapted to rotate about the guide rod 15 to the position shown by the phantom line.

Sockets 101 of a plurality of fasteners 100 will be received successively in series in the groove 11 and held between the slider 13 and the stopper plate 19. The forward end of the groove 11 and the inner or rearward surface of the stopper plate 19 are so spaced as to provide a gap 20 enough great to therein receive only one socket 101, and this gap 20 is open toward below. In charging sockets 101 of a number of fasteners 100 into the groove 11, slider 13 may be retracted and engaged with the stopper 16 as before described and the stopper plate 19 may be rotated to its rotated position shown by the phantom line in FIG. 12 (*a*). When this condition is met of the apparatus, sockets 101 may be charged in the groove 11 one by one from the forward-end open portion thereof. Further, when the prescribed or preselected number of sockets 101 are thus supplied in the apparatus, the stopper plate 19 may be rotated to its original or normal position and the engagement between the stopper 16 and the slider 13 may be released by pressing down the raised rear end of the former. The slider 13 and the spring 14 exerting an elastic force to the former, in combination, function as a pusher means, and constantly apply a pressure against the sockets held in series in the groove 11 to force them toward the forward end of the socket holder 1. As a result, the foremost located one of sockets 101 mounted in series in the groove 11 can abut against the stopper plate 19 and be located in the gap 20.

Then, with the inserting-part holder 2, which is located lower to the above described socket holder 1, this again is composed of a longitudinally divided left and right elengated members 21 and 21′, which are coupled in an integral structure through a plate member 22. Formed longitudinally between the two members 21 and 22 are a groove 23 and another groove 24, of which the former has a larger sectional area than the latter. Also, the plate member 22 is formed with a longitudinal slit 25. Relative to the grooves 23 and 24 and also the slit 25, a slider 26 is slidably fitted.

Figure 8:
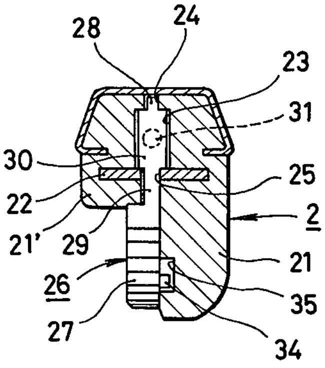
FIG. 8 shows another sectional view, taken on line VIII—VIII of FIG. 4.

As illustrated in FIG. 8, the slider 26 has guide parts 28 and 29 respectively fitted in the groove 24 and the slit 25, and has a knob 27 extended toward below beyond the plate member 22. The slider 26 further comprises a pusher part 30, and rearward of this pusher part 30, a spring guide rod 31 is extended, and in a manner of being wound about the guide rod 31, a coiled spring 32 is mounted between the pusher part 30 of the slider 26 and a wall surface at the rear end of the groove 23. The slider 26 is constantly forced by the spring 32 in the direction toward the forward end of the inserting-part holder 2.

At a point below the rear end of the groove 23, there is a stopper 33 pivotally mounted by a pin **33*b* (FIG. 4). This stopper 33 has a hook 33*a* which, when the slider 26 has been moved backward against the resilient force of the spring 32, can engage a projection 34 formed on a side face portion of the slider 26 (FIG. 8) so as to hold the slider in a stationary position. Indicated at 35 in FIG. 8 is a groove along which the projection 34 is moved. To release the above made engagement between the hook 33*a* of the stopper 33 and the projection 34 of the slider 26, this can be easily effected simply by pivoting the stopper 33** toward up.

Figure 9:
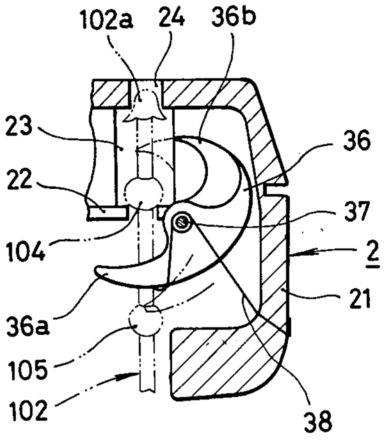
FIG. 9 shows still another sectional view, taken on line IX—IX of FIG. 4.

As best seen in FIG. 9, an arched or crescent-shaped member 36 is pivotally mounted in a forward end portion of the groove 23 through a pivot pin 37. This member 36 has a stop pawl **36*a* and a divider pawl 36*b* at one and the other side ends thereof, respectively, and it is actuated by a spring 38 in a manner such that the stop pawl 36*a* is maintained in a position lying across the center lines of grooves 23 and 24**.

Inserting parts 102 of a plurality of fasteners 100 will be charged in series in grooves 23 and 24 in an arrangement such that the head **102*a* is situated in groove 24, while the lump portion 104 being situated above the slit 25 below the groove 23, and they are held between slider 26 and the arched member 36. At the forward end of groove 23, the stop part 36*a* of the arched member 36 bears against a portion of the filament lying between the two lump portions 104 and 105**.

Figure 10:
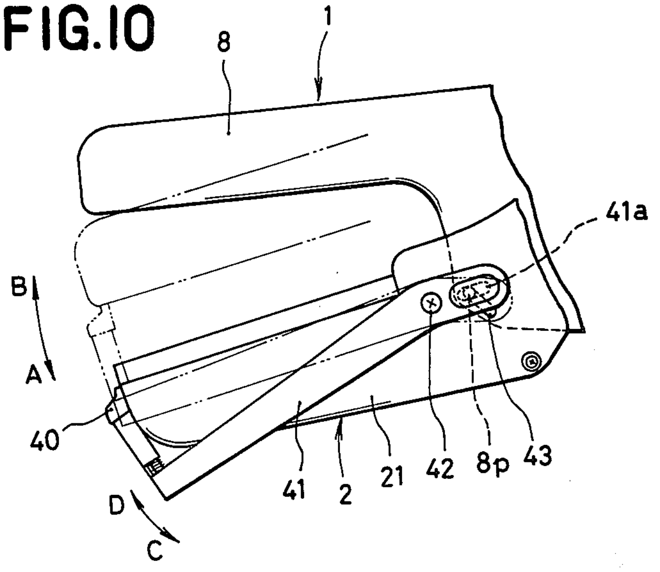
FIG. 10 is a side elevational view, showing a forward or front end portion of the apparatus of FIG. 4 as viewed at on the other side of FIG. 4.

Disposed in the proximity of the forward end of the inserting-part holder 2 is a gripper 40 carried by a lever 41. As shown in FIG. 10, the lever 41 is pivotally supported by a screw pin 42 to a side portion of the elongated member 21. Also, a slot **41*a* provided on an inner face portion of the rear end of the lever 41 is engaged with a pin 8*p* fixed on the elongated member 8 of the socket holder 1. The pin 8*p* engages the slot 41*a* through a slot 43 formed on the side of the elongated member 21 in an arc shape with the pin 5 as the center. Thus, when grip handles 3 and 4 are operated to thereby pivot the holders 1 and 2 in directions shown by the bidirectional arrow A-B, the lever 41 will undergo pivotal motions in the directions of a bidirectional arrow C-D with the pin 42 as the fulcrum on account of the engagement between the pin 8*p* and the slot 41*a*. In consequence, in accord with the pivotal motion of the lever 41, the gripper 40 supported by the lever 41 undergoes forward and backward motions between its position at the forward end of the inserting-part holder 2 and its position at a point lower to the forward end of the upper located socket holder 1**.

Figure 11:
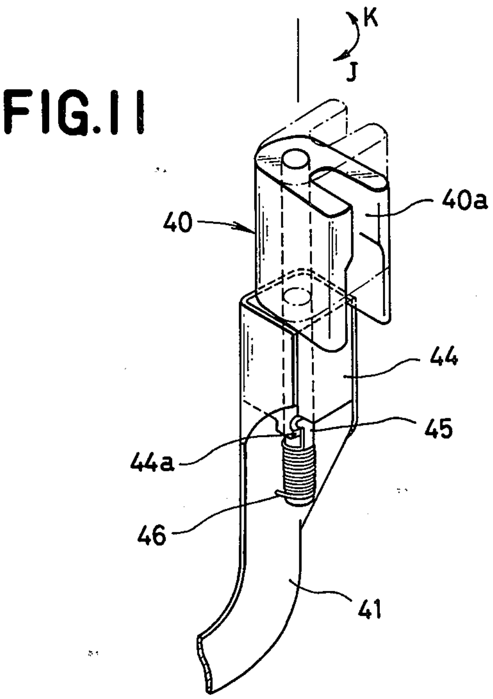
FIG. 11 is an enlarged perspective view, showing a pushing means in the apparatus of FIGS. 3 and 4.

As illustrated in FIG. 11, at the top end of the lever 41, a block 44 is fixed, to which a shaft 45 is rotatably secured, and the above-mentioned gripper 40 is mounted on an upper end portion of the shaft 45. At its lower end portion, the shaft 45 has a coiled spring 46 wound about the same. One end of the spring 46 is fixed to lever 41, while the other end being fixed to the shaft 45. Thus, the shaft 45 is constantly subject to rotatory resilient force in the direction shown by letter J of a bidirectional arrow J-K, and with a part of the spring 46 being engaged with a stopper **44*a* protruded at the lower end of the block 44, it can maintain a constant position. Accordingly, although it can be rotated in the direction of K of the arrow J-K, the gripper 40 can be automatically returned by the elastic force of spring 46 to the prescribed position at which the returning motion thereof is restricted by the stopper 46. The gripper 40 is provided with a grip groove 40*a* which vertically runs through a front portion of the gripper. This grip groove 40*a* receives and holds therein a filament or linear portion in the inserting part 102 of the fastener 100**.

As before described, when grip handles 3 and 4 are gripped to let holders 1 and 2 approach to each other, the gripper 40 is moved from a position in the vicinity of the front end or forward end of the inserting-part holder 2 to a position closely adjacent and lower to the forward end of the socket holder 1. On the contrary, when the gripping of handles 3 and 4 is released, the gripper 40 can return from its position closely adjacent and lower to the forward end of the socket holder 1 to its position in the proximity of the forward end of the inserting-part holder 2. At the time when the gripper 40 undergoes returning motion to the proximity of the front end of the holder 2 as above, the gripper functions with its lower end to kick down the stop pawl **36*a* of the arched member 36 then in the position shown by solid lines in FIG. 9, whereby the member 36 is caused to rotate against the resilient force of the spring 38 to take the position shown by the phantom lines. As a result of such rotation of the arched member 36, the divider pawl 36*b* thereof is driven to enter the space between a foremost located one and the immediately next located one of the series mounted inserting parts 102 and, while pushing the foremost located inserting part 102 forwardly, presses such inserting part into the grip groove 40*a* of the gripper 40 so as to let the inserting part be held in the groove. The inserting part 102 in reference is pressed in the grip groove 40*a* in a manner such that the two lump portions 104 and 105 are situated respectively on and beneath the gripper 40**.

Figure 13:
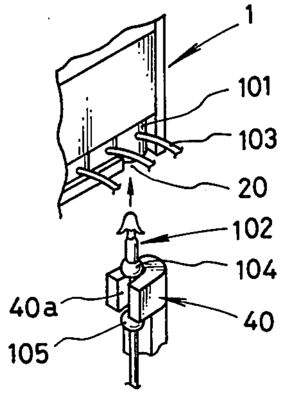
FIGS. 13 (*a*) and 13 (*b*) are respectively a schematic perspective view, taken for illustration of the fastener locking operation with the apparatus of the present invention.
Figure 13:
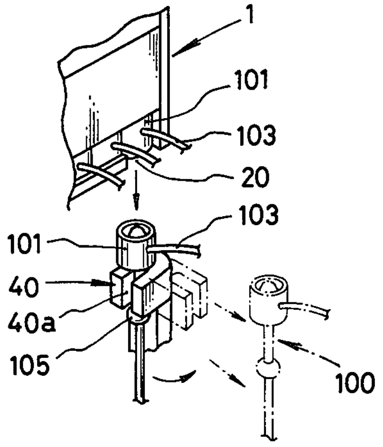

From the above, it will be understood that in order to carry out locking of fasteners with use of the above described dispensing apparatus, it may be operated to place an article or ware to which it is intended to apply a fastener in a condition of being engaged with either of the socket holder 1 or the inserting-part holder 2 through a hole, loop or a like annular portion of the article or ware while the holders 1 and 2 are maintained in an open condition as before stated, and then grip the two holders 1 and 2 at the same time, like in the case of operating cutting with a pair of scissors. By the gripping operation, holders 1 and 2 can undergo a motion to approach relative to each other like two blades of a pair of scissors. At the same time, the gripper 40 undergoes rising with the inserting part 102 of a single fastener held in its grip groove 40*a* as shown in FIG. 13 (*a*), and presses the head of the inserting part 102 into the through aperture 101*a* of socket 101 which has been received in gap 20 of the socket holder 1 to thereby effect locking engagement of the inserting part and the socket, that is, locking of the fastener.

When the gripping of grip handles 3 and 4 may then be released, the gripper 40 undergoes lowering motion. At this point, the inserting part 102 held by the gripper 40 has already been in locked engagement with the socket 101, so that as shown in FIG. 13 (*b*), the gripper 40 undergoing descent will accompany the socket 101 lockably engaged with the inserting part 102. Accordingly, it may be operated to suitably control the operation of holders 1 and 2 so as to interrupt the descending motion of the gripper 40 for a moment, and pull the filament of the locked fastener in a lateral direction, upon which the gripper 40 will rotate in the direction of the above pulling and the fastener will come out of the grip groove 40*a* of the gripper 40.

In completing a full cycle of the locking operation in connection with a first or foremost located fastener as above, it takes place that the socket 101 of a second fastener or a fastener immediately next following the first one is pushed by the slider 13 and situated in the gap 20 of the holder that has now been freed of the socket of the first fastener. Also, as soon as the gripper 40 is returned to its position substantially at the front end of the inserting-part holder 2, the inserting part 102 of the second fastener will become received by the gripper 40. Thus, according to the present invention, it is feasible to operate the fastener locking operation in a continuous manner.

As described in detail above, the apparatus according to the present invention has such structural features in which a socket holder having a groove for therein holding sockets of a plurality of fasteners in a series arrangement and an inserting-part holder adapted to hold inserting parts of the same plurality of fasteners in the same series arrangement as above are provided structurally in a manner capable of being approached and parted relative to each other, and in which a pressing means is further provided, which in association with the approaching and parting motion of the socket holder and the inserting-part holder, can drive the inserting part of a fastener located at the prescribed point at the forward end of the inserting-part holder to be pressed into the socket of the same fastener located also at the prescribed point at the forward end of the socket holder. Having the above briefed structural features, the present invention makes feasible to mechanically and continuously operate locking and dispensing of self-lockable filament-type fasteners, in the extremely simple manner of operation of gripping and releasing a pair of holders.

What is claimed is:

1. Apparatus for locking self-lockable fasteners individually including an intergrally formed socket having a through aperture, and an inserting part having two spaced apart lump portions, and an intermediate filament connecting together said socket and said inserting part, comprising:

a socket holder having forward and rearward ends and a groove for holding sockets of a plurality of fasterners in series and a pusher for forcing said plurality of serially arranged sockets toward an opening at said forward end of said socket holder;

an inserting part holder having forward and rearward ends and a groove for holding inserting parts of said plurality of fasteners in said serial arrangement as above, and a pusher for forcing said plurality of serially arranged inserting parts toward an opening at said forward end of said inserting part holder, said socket holder and said inserting part holder being structuraly engaged with each other so as to approach and part relative to each other when said apparatus is operated, said socket holder and said inserting part holder respectively having a grip handle connected at said respective rearward ends, said handles being operable to produce said approaching and parting motion relative to each other; and pressing means for pressing the inserting part of a first fastener located in said opening at said forward end of said inserting part holder into said through aperture of said socket of said first fastener located in said opening at said forward end of said socket holder, said pressing means including a gripper for holding said inserting part of said first fastener, said gripper being formed with a groove therein, so that said inserting part when held by said gripper is held in said groove, said gripper engaging said inserting part between said two spaced-apart lump portions, said pressing means further including a lever having a first end and a second end, said lever being pivotally coupled to said inserting part holder at said second end, said gripper being affixed to said first end of said lever, said second end of said lever being further coupled to said socket holder, so that when said grip handles are operated to bring said socket holder and said inserting part holder together, said first end of said lever will pivot towards said socket holder wherein said gripper affixed to said first end of said lever will move from a position at said forward end of said inserting part holder upwardly and rearwardly to a position at a point below the forward end of said socket holder, wherein said gripper will carry said inserting part of said first fastener held in said inserting part holder to said socket of said first fastener located at said forward end of said socket holder, pressing said held inserting part into said socket of said first fastener.

2. Apparatus as claimed in claim 1, wherein said pusher of said socket holder is composed of a slider slidably fitted in said groove of said socket holder and a spring exerting an elastic force to said slider.

3. Apparatus as claimed in cliam 1, wherein said pusher of said inserting-part holder is composed of a slider slidably fitted in said groove of said inserting-part holder and a spring exerting an elastic force to said slider.

4. Apparatus as claimed in claim 1, which further comprises a member rotatably mounted in said opening at said forward end of said inserting-part holder and having a stop pawl and a divider pawl, said member being operated in association with said pressing means to alternately carry out interruption of transfer of said plurality of serially arranged inserting parts and separation and sending-out of inserting parts one at a time.

5. Apparatus as claimed in claim 4, wherein said rotatably mounted member is made to be rotated by contacting said gripper when said gripper is reciprocated.

6. Apparatus as claimed in 1, which further comprises a stop plate pivotally mounted in the opening at said forward end of said socket holder, said stop plate being operable to switch between a position at which it prevents sockets held in said socket holder from coming out of said holder and another position at which it permits said sockets to come out of said holder.

* * * * *